Sept. 27, 1932.  M. MUTRUX ET AL  1,879,415

VALVE OPERATING MEANS

Filed Sept. 17, 1930

M. Mutrux
R. Caillet
INVENTORS

By: Marks & Clerk
ATTYS.

Patented Sept. 27, 1932

1,879,415

UNITED STATES PATENT OFFICE

MARCEL MUTRUX AND ROBERT CAILLET, OF VEVEY, SWITZERLAND

VALVE OPERATING MEANS

Application filed September 17, 1930. Serial No. 482,607.

This invention relates to improvements in valve operating means and has for its object to provide an arrangement for the opening and quick closing of a valve which arrangement is of simple construction and efficient in operation.

In order that the invention may be fully understood and readily carried out, one constructional form of the improvements relating to valve operating means are described hereinafter, by way of example, and illustrated in the accompanying drawing.

Figure 1:
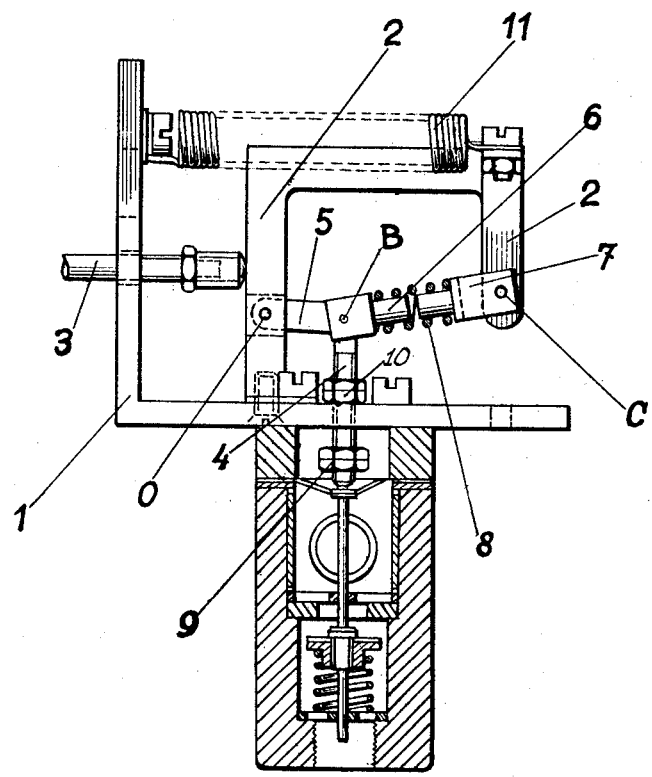
Figure 2:
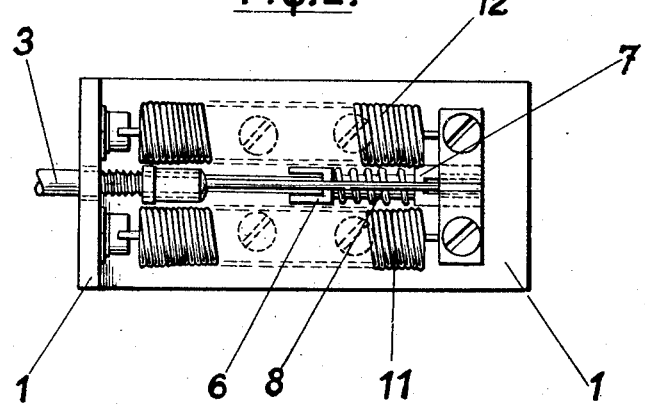

In this drawing:

The Figure 1 is an elevation, with the valve in section, and the Figure 2 is a plan view of Figure 1.

The arrangement according to the form of the invention illustrated comprises a cranked lever 2 pivoted at O to a support 1. The end of a control shank 3, displaceable under the influence of temperature, bears upon the lever 2.

A lever 6 connected by means of a spring 8 to a lever 7 which is pivoted at C to the end of the lever 2; and a lever 5, pivoting at O, are both pivotally connected at B to the shank 4 of the valve. Abutment members 9 limit the travel of the shank 4. The lever 2 is pressed against the shank 3, by the action of springs 11 and 12.

The arrangement illustrated is especially adapted for gas warming installations and is arranged to interrupt quickly the flow of the gas when the desired temperature is reached.

The arrangement operates as follows:

The shank 3, under the influence of temperature variations, is displaced, compelling the lever 2 which is constantly pressed against it by springs 11 and 12, to oscillate about point O. The extremity C of said lever 2 turns around the pivot O (the joint B remaining immovable), and the spring 8 is compressed. At the moment, when the points O, B and C are in a straight line, the arrangement is in a state of unstable equilibrium and it is sufficient for the point C to be displaced by a further small amount only, in the same direction for spring 8, to expand and thereby move the shank 4 of the valve, very quickly to place the valve into its extreme position.

The device is adjusted or regulated by the abutment screws 9 and 10 in the following manner:

1. If, for example, the abutment screw 9 is turned upward, the center B is lowered and the position of unstable equilibrium in which the levers 5 and 6, 7 are in a straight line O, B, C is shifted at a certain angle about O. Consequently, the movement which the end of the bell crank lever 2 must make for closing the valve 15 is increased which corresponds to a greater displacement of the control rod 3. It continues until the valve is closed.

2. If the abutment screw 10 on the rod 4 is turned downward, the center B will be shifted upward and the position of unstable equilibrium is shifted upward through a certain angle. Consequently, the control rod 3 must undergo a further displacement for opening the valve. It continues until the valve is opened.

3. A simultaneous displacement of the abutment screws 9 and 10 permits the variation of the amplitude of movement of the end 2 of the bell crank lever between the two positions of the unstable equilibrium. By approaching the abutment screws 9 and 10, the difference of temperature between the opening and closing of the valve will be decreased. By moving the abutment screws 9 and 10 apart, the difference of temperature between the opening and closing of the valve 15 is increased.

This corresponds of course to the case wherein the drive is effected by the displacement of the right end of the control rod 3, the displacement taking place owing to the extension of the rod.

Having now particularly described and ascertained the nature of our said invention and in what manner the same is to be performed, we declare that what we claim is:

1. In combination, a bell crank lever, a valve rod, two links arranged at both sides of the rod and pivotally connected with the latter, said links being displaced to a position of unstable equilibrium incident to movement of the bell crank lever, spring means coacting with certain of said links to effect rapid movement of the valve rod upon continued movement of the bell crank lever, said link being of variable length and subjected to the tension of the spring means, and abutments on the valve rod for limiting the opening and closing movement thereof.

2. An arrangement as claimed in claim 1, characterized in that said variable length link being at one end connected to the valve rod is connected at its opposite end to the bell crank lever, the spring means being tensioned during displacement of said lever.

In testimony whereof we affix our signatures.

MARCEL MUTRUX.
ROBERT CAILLET.